United States Patent [19]

Matsumoto

[11] Patent Number: 4,650,316
[45] Date of Patent: Mar. 17, 1987

[54] METHOD FOR DETECTING IMAGE INFORMATION

[75] Inventor: Fumio Matsumoto, Tokyo, Japan

[73] Assignee: Fuji Photo Film Co., Ltd., Kanagawa, Japan

[21] Appl. No.: 831,439

[22] Filed: Feb. 20, 1986

[30] Foreign Application Priority Data

Mar. 13, 1985 [JP] Japan .................. 60-49685
Mar. 13, 1985 [JP] Japan .................. 60-49686

[51] Int. Cl.⁴ .................................. G03B 27/52
[52] U.S. Cl. .................................. 355/55; 250/202; 354/402; 355/68; 358/227
[58] Field of Search ............ 355/38, 55, 56, 68; 354/402; 250/202; 358/227, 302; 364/577

[56] References Cited

U.S. PATENT DOCUMENTS

| | | | |
|---|---|---|---|
| 3,469,105 | 9/1969 | Stasey | 355/38 X |
| 3,708,676 | 1/1973 | Huboi et al. | 355/38 X |
| 3,829,214 | 8/1974 | Zahn et al. | 355/38 X |
| 3,873,201 | 3/1975 | Amano | 355/38 X |
| 4,218,133 | 8/1980 | Biedermann | 355/56 |
| 4,268,165 | 5/1981 | Bradmon | 355/55 |
| 4,375,916 | 3/1983 | Levine | 355/56 X |
| 4,383,274 | 5/1983 | Inuiya | 358/227 |
| 4,532,602 | 7/1985 | Du Vall | 364/577 |

*Primary Examiner*—Richard A. Wintercorn
*Attorney, Agent, or Firm*—Wenderoth, Lind & Ponack

[57] ABSTRACT

It is necessary to photographically measure the density of an original film or to measure the size of a film manually or automatically for input in photographic printing system in order to determine printing exposure amount or correction amount therefor. Image sensors are usually used as a means in such measurement, but image information should be detected always under the same conditions irrespective of the size of negative film frames. This invention method allows effective detection of the whole frame of an original film with substantially the whole area of an image sensor as the method can make the sizes of light receiving areas on the image sensor constantly substantially identical to each other.

9 Claims, 18 Drawing Figures

| | | | | | | | MA | | VA | | | | | | | | | |
|---|---|---|---|---|---|---|---|---|---|---|---|---|---|---|---|---|---|---|
|150|148|149|150|151|152|155|156|150|149|147|145|148|151|153|151|150|149|151|151|
|148|147|148|71|75|80|82|85|90|87|85|80|79|77|78|78|80|150|151|151|
|145|146|145|73|45|47|50|52|53|53|52|51|50|48|47|46|82|151|152|152|
|147|148|147|80|46|28|27|25|24|26|28|30|32|33|36|50|84|150|151|153|
|151|150|149|82|48|30|0|0|0|0|0|0|0|0|35|53|84|149|152|150|
|153|152|152|80|50|33|0|0|0|0|0|0|0|0|30|50|85|148|150|150|
|149|145|153|83|52|35|0|0|0|0|0|0|0|0|28|51|80|147|150|150|
|147|144|150|81|53|34|0|0|0|0|0|0|0|0|26|53|79|149|151|150|
|146|147|149|78|50|30|28|30|33|36|40|38|34|32|30|52|78|150|151|150|
|150|146|151|77|51|48|47|46|49|50|52|49|48|47|48|50|80|152|149|149|
|152|143|150|80|82|85|90|92|91|88|85|84|83|82|84|83|82|153|150|148|
|150|142|147|149|152|153|151|152|149|147|146|145|151|152|154|153|152|154|151|149|

FIG. 6B

|52|35|37|40|38|41|43|41|37|36|38|40|42|45|46|50|51|48|40|51|
|---|---|---|---|---|---|---|---|---|---|---|---|---|---|---|---|---|---|---|---|
|54|38|0|0|0|0|0|0|0|0|0|0|0|0|0|0|0|0|36|52|
|50|33|0|0|0|0|0|0|0|0|0|0|0|0|0|0|0|0|38|55|
|53|30|0|0|0|0|0|0|0|0|0|0|0|0|0|0|0|0|40|60|
|55|32|0|0|0|0|0|0|0|0|0|0|0|0|0|0|0|0|42|61|
|57|34|0|0|0|0|0|0|0|0|0|0|0|0|0|0|0|0|45|65|
|61|38|0|0|0|0|0|0|0|0|0|0|0|0|0|0|0|0|47|63|
|63|40|0|0|0|0|0|0|0|0|0|0|0|0|0|0|0|0|45|61|
|65|42|0|0|0|0|0|0|0|0|0|0|0|0|0|0|0|0|44|58|
|60|39|0|0|0|0|0|0|0|0|0|0|0|0|0|0|0|0|43|56|
|58|38|0|0|0|0|0|0|0|0|0|0|0|0|0|0|0|0|42|54|
|54|36|35|33|36|37|34|33|30|38|37|36|35|38|40|42|43|40|41|53|

METHOD FOR DETECTING IMAGE INFORMATION

BACKGROUND OF THE INVENTION

This invention relates to a method for detecting image information which is capable of automatically detecting the image information of an original picture film such as a negative film out of pixel information of a frame segmented into pixels of predetermined areas.

In a photographic printing system, it is necessary to photographically measure density of an original film (e.g. a negative film) in order to determine the exposure amount or correction amount in photographic printing. In the prior art, the average density of a negative film is photographically measured in LATD (large area transmittance density) with photosensors such as photodiodes provided near the optical path in the optical system. The method of image detection using LATD is generally adapted to photographically measure a negative film, but not to measure image density of the film precisely and all over the frame. The method therefore often presents problems such as inaccurate determination of exposure amount or correction amount. When printing a negative film onto a sheet of photographic paper, it is necessary to change the exposure amount or the correction amount depending on the size of the film frame due to the difference in light diffusion. The size of an original film is visually discriminated, and inputted from a key board mannually in the prior art. Alternatively, the size of the film is discrminated by reading status signals of the negative film mounted on a negative film carrier. These operations, however, involve cumbersome key operation or signal processing resulting in frequent errors in input.

Figure 1:
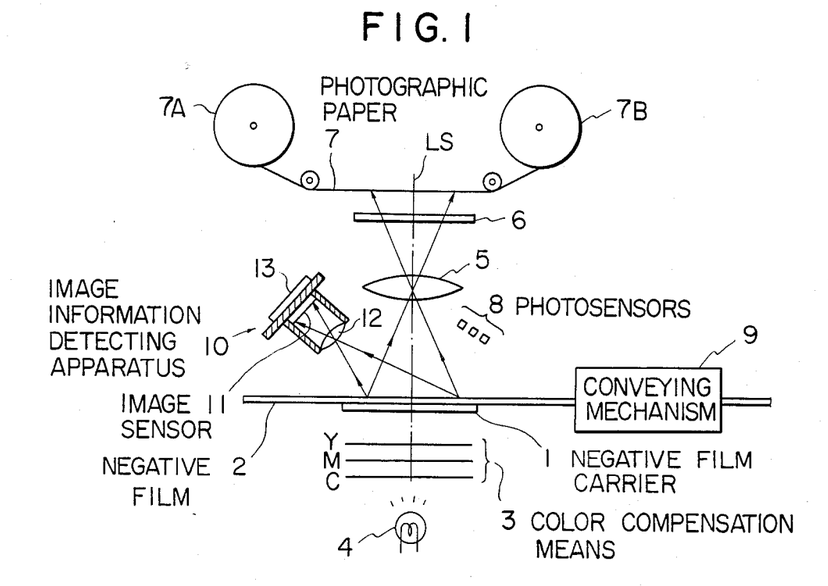
FIG. 1 is a structural view of an embodiment of a two-dimensional image sensor applied in an image information detection of a photographic printing system.

The present applicant has proposed a device shown in FIG. 1 in order to obviate such prior art defects (U.S. patent application Ser. No. 691,309). FIG. 1 shows one example of application of an image information detecting apparatus 10 in a conventional photographic printing system wherein a negative film 2 positioned on a negative film carrier 1 which has been conveyed to a printing section by a conveying mechanism 9 is illustrated with light from a light source 4 via color compensation means 3 of three complementary colors of yellow (Y), magenta (M) and cyan (C), and the light transmitted through the negative film 2 is directed to a sheet of photographic paper 7 via a lens unit 5 and a black shutter 6. The photographic paper 7 is coiled on a supply reel 7A, paid out and wound on a take-up reel 7B in synchronized movement with conveying or suspending movement of the negative film 2. Photosensors 8 such as photodiodes are provided near the negative film 2 on the side of the lens unit 5 detect image density information of red (R), green (G) and blue (B) or of the three primary colors. The detection signal from the photosensors 8 is used in photographic printing. The image information detecting apparatus 10 is provided near the negative film 2 at an angle from the optical axis LS of the light source 4 and the negative film 2. The apparatus houses a two-dimensional image sensor 11 comprising CCD (Charge Coupled Device) or MOS (Metal Oxide Semiconductor) and in front of the image sensor 11 is located a lens unit 12 which focuses substantially the center of the negative film 2. The image information detecting apparatus 10 is constructed as a unit having on the reverse side a substrate 13 which is packaged with a processing circuit of ICs (integrated circuits) and so on, for image processing.

Figure 2:
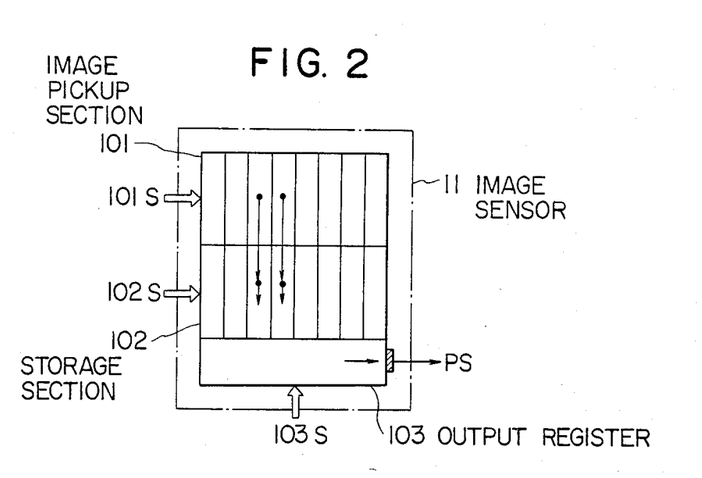
FIG. 2 is a structural view to show the function of the two-dimensional image sensor.

The two-dimensional image sensor 11 comprises, as shown in FIG. 2, and image pickup section 101 for optically picking up an image, a storage section 102 for storing charges transmitted from the image pickup section 101, and an output register 103 for outputting the charges stored in the storage section 102. By controlling driving signals 101S through 103S from a driving circuit, the image information in two-dimensions (area) is photoelectrically converted and outputted serially from the output register 103 in the form of an analog image signal PS. The circuit mounted on the substrate board 13 has, for example, a circuit structure shown in FIG. 3. The image sensor 11 is driven by driving signals 101S through 103S supplied from the driving circuit 20. The light illuminating the image pickup section 101 of the image sensor 11 is outputted from the output register 103 as a picture signal PS, sampled and held by a sampled-and-hold circuit 21 at a predetermined sampling cycle. The sample value thereof is converted by an analog-to-digital (A/D) converter 22 into digital signals DS. The digital signals DS from the A/D converter 22 are inputted into a logarithmic converer 23 for logarithmic conversion, then converted to density signals DN, passed through a write-in control circuit 24 and finally written in a memory 25.

Figure 3:
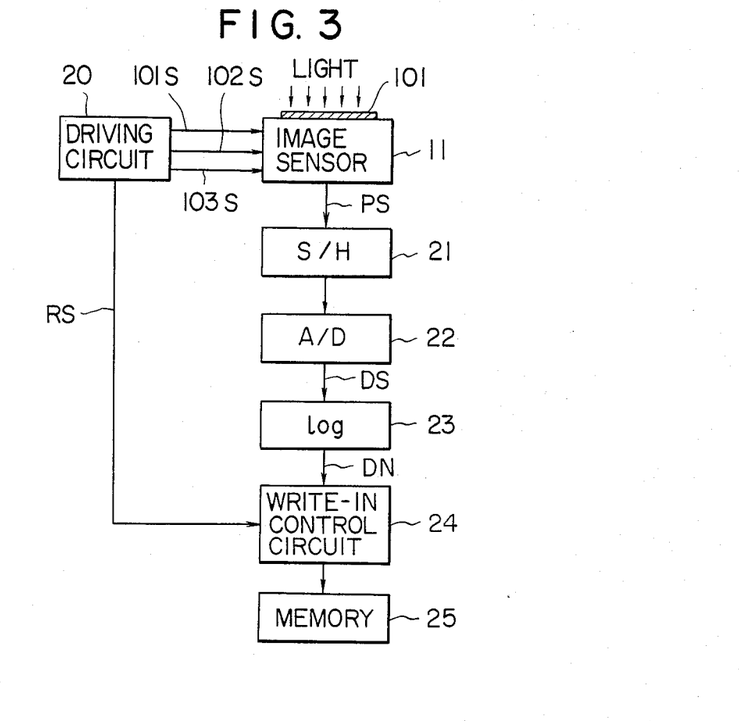
FIG. 3 is a block diagram to show the controlling system thereof.

A reading speed signal RS from the driving circuit 20 is inputted into the write-in control circuit 24 in order to read out image information at a predetermined speed when the image sensor 11 is driven. The write-in control circuit 24 writes in the density signals DS at predetermined positions of a memory sequentially and correspondingly with the driving speed of the image sensor 11. In other words, the reading speed of the image sensor 11 is determined by the driving speed. The reading speed in turn determines the segmentation number of pixels in respect of an image area. The memory 25 should therefore store the detected information in correspondence with the number of pixels, too.

When a picture is printed in a conventional manner in the above mentioned structure, the light transmitted through one frame of the negative film 2 which has been conveyed to and standing still are at a printing position is detected by the photosensors 8. Then, the filters in the color compensation means 3 are adjusted in response to the picture signals for each of the primary RGB colors and the black shutter 6 is opened to expose a photographic paper 7 with the determined exposure amount.

Figure 4A:
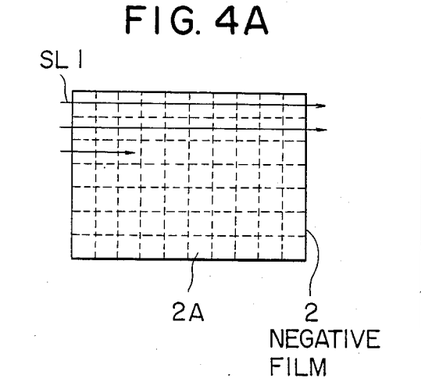
FIGS. 4A and 4B are the views to explain the corresponding between pixel segments of an original film and memory data.

According to this invention, on the other hand, an image information detecting apparatus 10 comprising a two-dimensional image sensor 11 of area scanning type such as a CCD is mounted at a position near the negative film 2 at an inclined angle in respect of an optical axis to facilitate mounting operation. The whole frame of the negative film 2 is segmented into a large number of arrayed pixels for detecting image information. In other words, when predetermined driving signals 101S through 103S are fed from the driving circuit 20 to the image sensor 11, the two-dimensional image sensor 11 is adapted to receive the light transmitted through the negative film 2 on the printing section via the lens unit 12. The two-dimensional image sensor 11 can therefore scan whole surface of a frame of the negative film 2 along the sanning lines SL1 sequentially by segmenting the whole area into a large number of small arrayed pixels as shown in FIG. 4A. After the whole area has been scanned, the output register 103 of the image sensor 11 outputs a picture signal PS sequentially, then the picture signal PS is sampled and held by the sampled-and-hold circuit 21 and the sampled value thereof is converted by the A/D converter 22 into digital signals DS. The digital signals DS from the A/D converter 22 are logarithmically converted by the logarithmic converter 23 to density signals DN. The density signals DN are controlled by the write-in control circuit 24 to be stored in a memory in the arrays corresponding to the pixels 2A shown in FIG. 4B and in terms of the density digital values of the negative film 2.

Figure 4B:
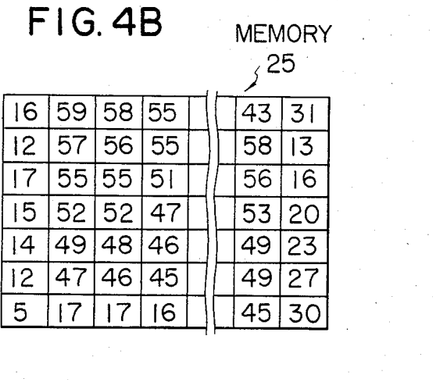

If the digital values for respective pixels of the negative film 2 or the density values for respective elements in respect of three primary colors are stored in the memory 25, it is possible to read out the digital values for any particular pixels of the negative film 2 out of the memory 25. If the density values for respective three primary colors of R, G and B are stored as shown in FIG. 4B, it is possible to read out such values from the memory for processing (which will be described hereinafter) in order to determine the exposure or correction amount for photographic printing in the same manner as in the prior art.

Figure 5:
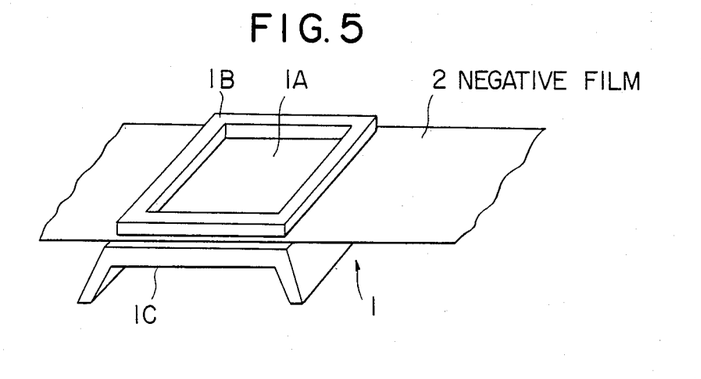
FIG. 5 is a view to show a printing section of the device in detail.
Figure 6A:
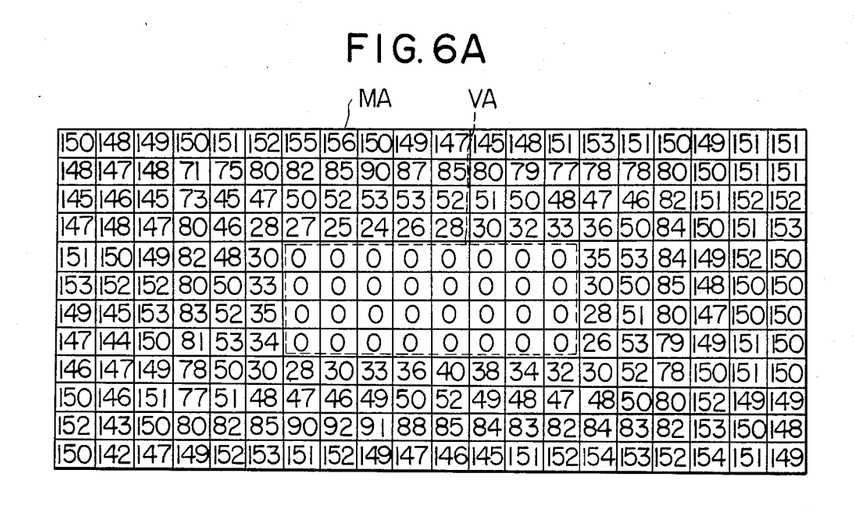
FIGS. 6A and 6B are charts of memories to show examples of image information, respectively.
Figure 6B:
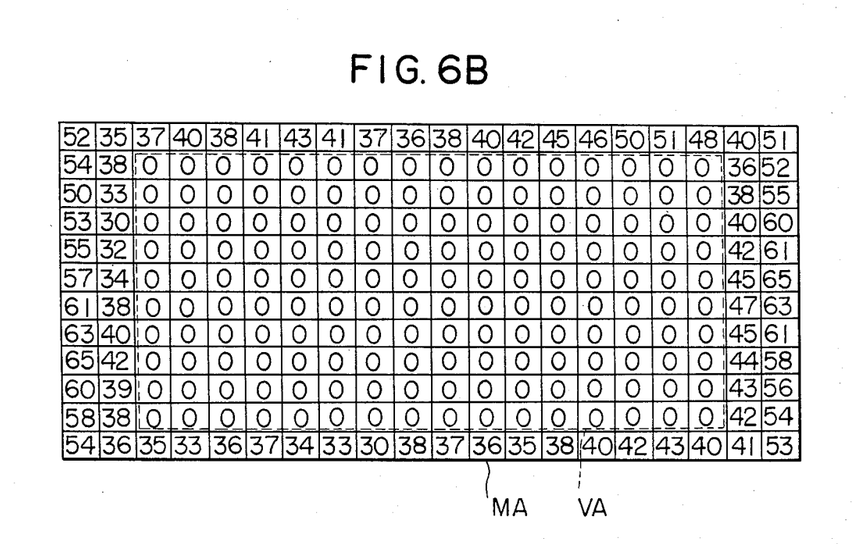

An elongated negative film 2 is conveyed consecutively frame by frame by a conveying mechanism 9 to a position on a negative film carrier 1. As shown in FIG. 5, a rectangular upper guide 1B having a frame aperture 1A is engaged with a lower guide 1C positioned therebelow in order to hold the negative film 2 therebetween for printing the film 2 frame by frame. The size of the aperture 1A of the upper guide 1B is completely identical with the size of a frame of a negative film 2 so that the peripheral portion of the frame without image or unexposed portion would not fall outside the area of the aperture 1A of the upper guide 1B. The area from which the two-dimensional image sensor 11 receives light is determined to correspond not only with one frame of the negative film 2 but also with a large sized film. The area includes the portion of the upper guide 1B where the light does not transmit. The image information of the area which the two-dimensional image sensor 11 detects becomes as shown in FIG. 6A in the case of a negative film carrier of 110 size while it becomes as shown in FIG. 6B in the case of the carrier of 135 size. FIGS. 6A and 6B show examples of detected image information of the unexposed portion (the developed film portion where no image is pictured) wherein the portion VA encircled by broken lines at the center defines the aperture 1A or the area of a frame. As the size of a frame corresponds to the size of a negative film 2, the size of an aperture 1A can be obtained by detecting the density "0" which means the transparent portion without image data read by the image sensor 11 and counting the area or the number. This leads to the discrimination of the size of a negative film 2. In this case, as the optical axis of the image sensor 11 is directed toward the substantial center of the aperture 1A, the size of the negative film 2 can be discriminated by counting the number of picture elements having the density "0" (or having the value close thereto) in hardware or software and comparing the counted value with a predetermined value for each size.

As described above, the size of the negative film 2 is determined by measuring the area of the density "0" and corresponds to the number of picture elements, which indicates the size of the aperture 1A of the negative film carrier 1. For example, as shown in FIG. 6A, if the number of picture elements of the density "0" is "32" (which may be 30 to 34 for allowance margin), the size is judged to be 110 size, as shown in FIG. 6B, if the number is "160" (which may be 156 to 164 for allowance margin), the size is judged to be 135 size, and if the number is "196" to "204", the size is judged to be 126 size. However, the method of size discrimination is not limited to the above method. The size information judged in the above manner is supplied to the photographic printing system so as to determine exposure amount by selection of applicable formula or by calculation with a formula for conducting photographic printing process in correspondence with the particular size.

In determining the exposure amount, the transmittance of the light of RGB color components over the whole area is controlled usually at a constant value so as to realize a print with balanced color and exposure. This is based on the empirical rule that the average reflectivity or transmittance of three colors obtained by integration of the whole scene, when an ordinary scene is photographed, is substantially constant. In other words, if a neutral object is exposed in a color negative film, the average LATD varies depending on the exposure amount, the quality of the light from a light source, the sensitivity of the RGB photo-sensitive layers of the color film, use of a mask, etc., but those variations can be controlled by making the printing exposure amount for R, G and B constant at the time of printing.

The variation in density of the three colors of a color film caused by the difference of color distribution of an objects, on the other hand, cannot be controlled appropriately by the above mentioned method because the variation affects the area component ratio among the three colors. In the case where the composition in luminance is quite different from ordinary distribution, e.g. the one with extremely large area of high luminances or the one with large area of low luminance, the LATD cannot be properly controlled by the method of merely controlling the printing exposure amount with the average LATD because the variation in density on the negative film is caused by the area-wise variation of density of the object. Similarly, if the main object of a scene has the shadowed portion or extremely highlight portion compared with the surrounding objects, the density cannot be corrected as there are involved conditions extremely different from those preset in the printer. In order to solve such problems in determining printing exposure amount, there have been proposed methods as disclosed in Japanese Patent Laid-open No. 23936/1977, No. 28131/1979 or Japanese Patent Publication No. 2691/1981 which segment a frame of a negative film to obtain image information from each segmented portion, and determine the exposure amount which is appropriate to the scene from all the information obtained from respective segments. If it is assumed that the average LATD of a frame is represented by Da, the maximum density of segmented frame by Dmax and the minimum density by Dmin, the exposure amount $X_1$ of a 135 F size film can be determined by the following equation:

$$X_1 = a_1 \cdot Da + b_1 \cdot Dmax + c_1 \cdot Dmin + d_1 \qquad (1)$$

The exposure amount $X_2$ of a 110 size film can be determined by the following equation (2):

$$X_2 = a_2 \cdot Da + b_2 \cdot Dmax + c_2 \cdot Dmin + d_2 \qquad (2)$$

If a correction formula Xs like the one shown below is made available for each film size, any negative film can be printed with a proper exposure amount which has been properly corrected for the particular size.

Coefficients Ki and Kj are determined separately by experiments for each size, respectively.

$$Xs = Ki + Kj \cdot x \tag{3}$$

When exposure amount is determined or corrected with the information obtained from segments of a frame, there still remains a problem as to how to segment a frame. Another problem lies in that if segmentation method should vary depending on the size of the film, calculation process becomes complicated. In order to avoid such inconvenience, this invention enables to determine the exposure amount by means of segmentation techniques common to all sizes by one-to-one correspondence between the number of segmented areas and the position thereof. More particularly, the above equations (1) and (2) are united to obtain one common formula as follows:

$$X = a \cdot Da + b \cdot Dmax + c \cdot Dmin + d \tag{4}$$

Figure 7A:
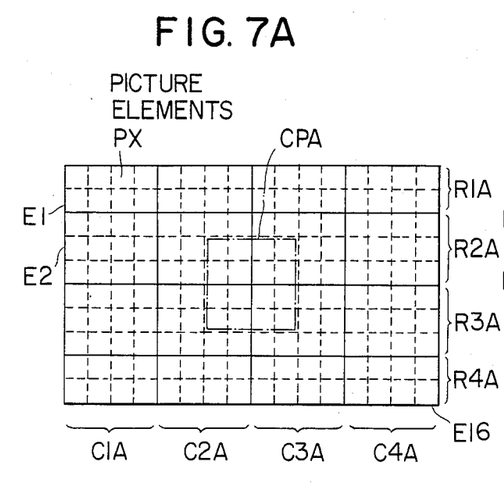
FIGS. 7A through 7E are charts to explain determination of exposure in accordance with the film size.
Figure 7B:
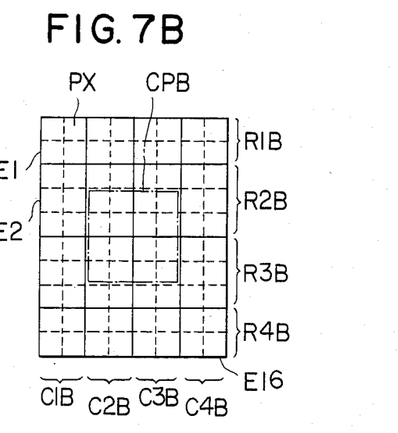
Figure 7C:
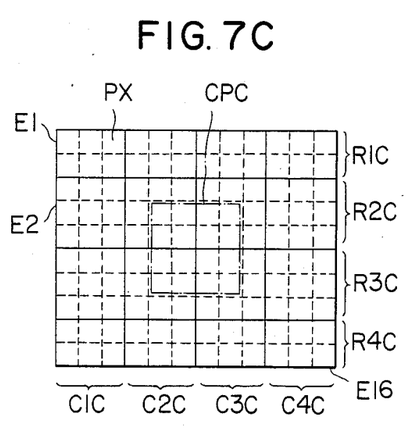
Figure 7D:
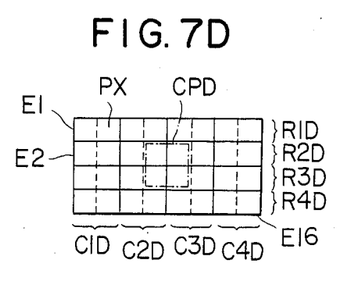
Figure 7E:
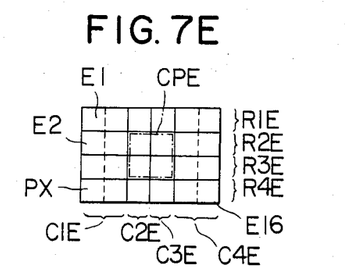

Simultaneously, as shown in FIGS. 7A through 7E the size of the picture elements PX per se which are to be detected by the two-dimensional image sensor 11 is made constant for all the sizes: a frame of a 135 F size film shown in FIG. 7A is divided into 16 groups, i.e. by four columns into elements C1A through C4A horizontally and into two-column, three-column, two-column and three-column elements R1A through R4A vertically, and the frame central data is obtained from the central area CPA comprising 16 picture elements. In a 135 size film in FIG. 7B, a frame is divided into 16 groups by two horizontal columns into elements C1B through C4B and into two-column, three-column, three-column and two-column elements vertically R1B through R4B and the frame central data is obtained from the central area CPB comprising 16 picture elements. In a 126 size film shown in FIG. 7C, a frame is divided into 16 groups by 3 horizontal columns to the elements C1C through C4C and two-column, three-column, three-column and two-column elements vertically R1C through R4C and the frame central data is obtained from the central area CPC comprising 16 picture elements. Similarly, a frame of 110 size is divided into 16 groups each of which comprises two horizontal columns and one vertical column (C1D through C4D horizontally and R1D through R4D vertically) and the central area CPS comprises four picture elements. The disk size film of FIG. 7E is divided into 16 groups by segmenting a frame into two-column, one-column, one-column and two-column elements horizontally C1E through C4E and by one vertical column R1E through R4E and the central area ĊPE comprises four picture elements. In this manner, all the frames of respective film sizes are divided into 16 groups E1 through E16 of segments and all the central area CPA through CPE are defined to include the center of the frame to obtain image information. It is therefore not necessary to change reading-out area of the image sensor for various film sizes. with only one common equation, a frame can be processed for any film size. One segment area may comprise plural elements; however, it is possible to obtain image information of each segmented area simply by calculating a mean value of each element data. As the frames of respective film sizes comprise area groups E1 through E16 and the central areas CPi (i=A through E), and as the average information of respective area groups E1 through E16 and CPi can be easily calculated from the data of component elements, the exposure amount X can be obtained by using the above formula (4) and the obtained exposure amount X can be corrected properly by the above formula (3), even if the size of each negative film conveyed to the printing section varies.

However, in the above mentioned embodiments, the two-dimensional image sensor 11 receives light at a constant magnification ratio irrespective of the size of the negative film frame. Although this equalizes the size of the images in relation to pixels of the two-dimensional image sensor 11, the size of the light receiving area on the image sensor inconveniently changes with a wide margin depending on the size of the negative film 2. As described in relation to FIGS. 7A through 7E, it becomes necessary to classify image information which widely differs from size to size to enable use of one common printing exposure expression. The conditions in detection of image information of the negative film 2 changes as mentioned above depending on the size of the film frame. This presents a problem especially in the case of a small size film because the number of its effective pixels is small to lower the resolution. This often incapacitates the device to perform sufficient processing.

SUMMARY OF THE INVENTION

This invention was contrived obviate aforementioned prior art problems and aims at providing a method for detecting image information which is capable of detecting a whole frame of negative film with substantially the whole corresponding area of an image sensor by automatically adjusting the size of the light receiving areas of a two-dimensional image sensor to be substantially the same size even if different sizes of original films are used.

According to this invention in one aspect thereof, for achieving objects described above, there is provided an image information detecting method comprising steps of illuminating an original film with light from a light source, and receiving the light through an aperture of a film carrier and a zoom lens set at a reference magnification with a two-dimensional image sensor, detecting image information of the whole area of said two-dimensional image sensor which receives the light for each pixel segment, discriminating the size of the original film by comparing said detected characteristic values with a reference value, and adjusting the light receiving areas of said two-dimensional image sensor in accordance with the result of said discrimination by driving said zoom lens to thereby detect image information in the area of substantially the same number of pixels irrespective of the size of said original film frame.

According to this invention in another aspect thereof, there is provided an image information detecting method comprising steps of illuminating an original picture with light from a light source and receiving the light transmitting or reflected from the original picture via a zoom lens, detecting image information in the whole area of said two-dimensional image sensor which receives light including the periphery of the original picture for every pixel segment, and driving said zoom lens in a manner to make the detected characteristic value coincide with a reference value and adjusting the light receiving area of said two-dimensional image sensor to thereby detect image information in substantially the same number of pixels irrespective of the size of original pictures.

The nature, principle and utility of the invention will become more apparent from the following detailed description when read in conjunction with the accompanying drawings.

DETAILED DESCRIPTION OF THE PREFERRED EMBODIMENTS

Figure 8:
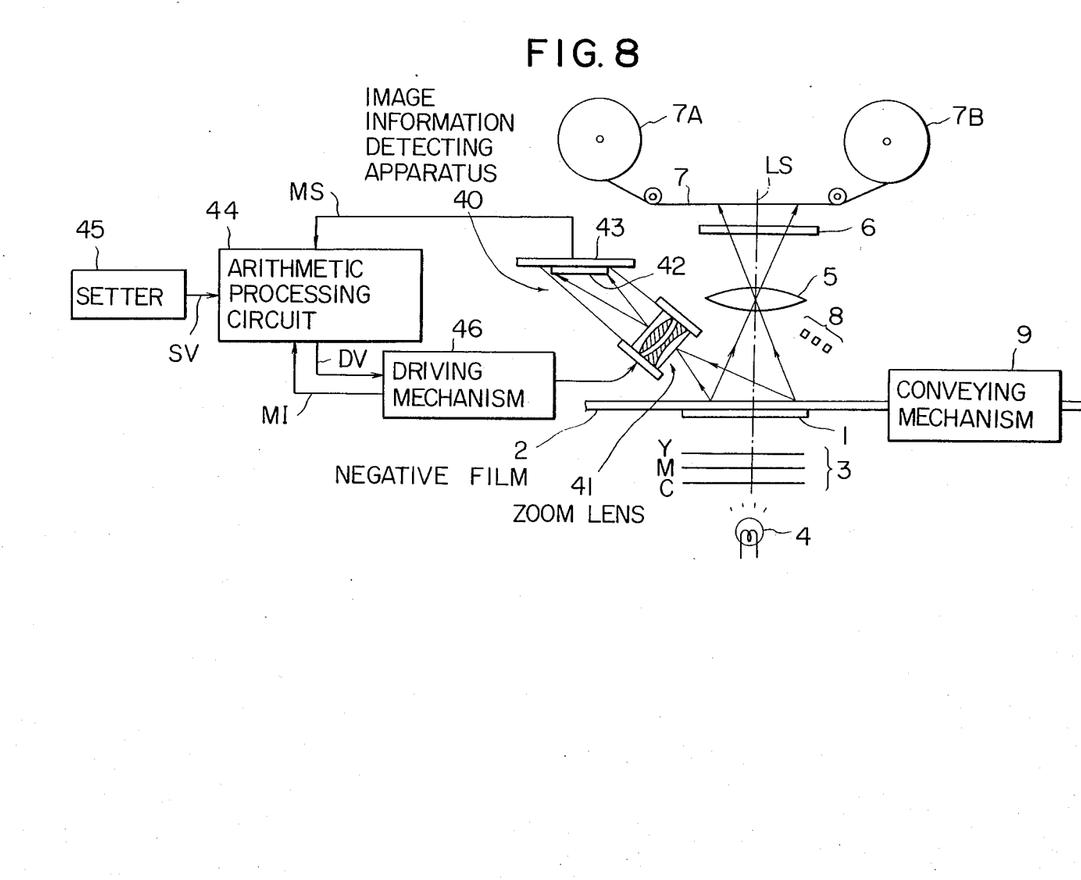
FIG. 8 is a structural view to show an embodiment of the device to realize this invention.

FIG. 8 shows a device embodiying this invention method wherein an image information detecting apparatus 40 comprises a two-dimensional image sensor 42 arranged in parallel to a negative film 2, a zoom lens 41 provided in front of the image sensor 42, and a substrate 43 housing circuits for driving the image sensor 42 and processing detection signals therefrom. The signal MS from the substrate 43 is inputted to an arithmetic processing circuit 44, and density setting signal SV from a setter 45 is inputted to the arithmetic processing circuit 44, too. The setter 45 sets the value of density "0" according to the frame size of the negative film 2. More specifically, as mentioned above, the number of the density "0" is set at the setter 45 for every size of the negative film 2. The arithmetic processing circuit 44 actuates the zoom lens 41 via a driving mechanism 46 to adjust the size of the area of the two-dimensional image sensor which is illuminated with the image information of the negative film 2.

Figure 9:
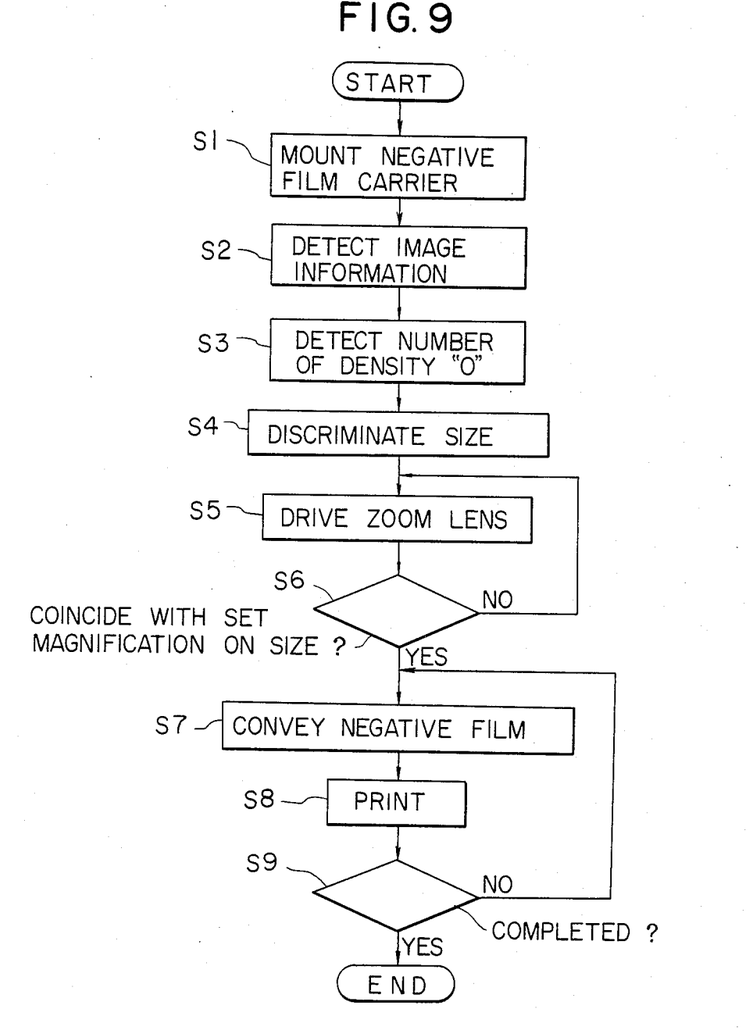
FIG. 9 is a flow chart to show this invention method.

The detection of the image data with the aforementioned structure will now be explained referring to the flow chart of IFG. 9.

Figure 10A:
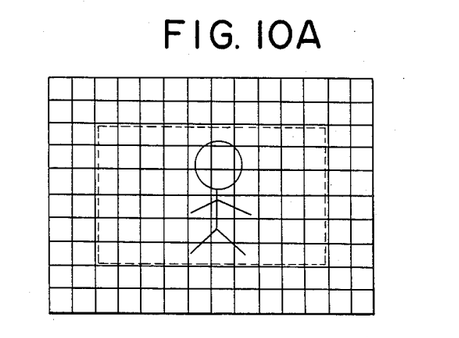
FIGS. 10A and 10B are views to explain operations thereof.
Figure 10B:
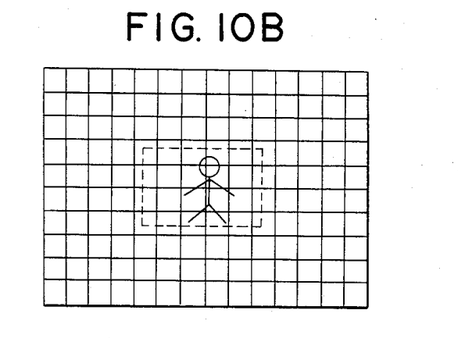

First, a negative film carrier 1 is mounted at the printing section (Step S1), the image information MS of the area defined by an aperture 1A is detected by the two-dimensional image sensor 42 via the zoom lens 41 which is adjusted at a predetermined magnification (Step S2), and the number of the "0" densities is detected by the arithmetic processing circuit 44 (Step S3). The setter 45 has already been set with the numbers of the density "0" and the magnifications in correspondence with each size of the negative film 2, and the setting signal SV has been inputted to the arithmetic processing circuit 44. The size of a negativer film frame can therefore be discriminated by comparing thus detected number of the density "0" areas within the aperture 1A of the negative film carrier 1 with the setting signal SV (Step S4). Alternatively, the size of the negative film 2 can be discriminated by detecting the length of the aperture 1A in a predetermined direction. The arithmetic processing circuit 44 feeds driving signals DV to the driving mechanism 46 in accordance with the discriminated size, and the driving mechanism 46 in turn drives the zoom lens 41 (Step S5). The magnification index MI is detected to check whether it is set at a correct value at the zoom lens 41 after the focal length is changed interlockingly so that the set magnification coincides with the magnification of the film size set by the setter 46 (Step S6). The zoom lens 41 is repeatedly driven until the time the above magnification coincides with the set value. FIG. 10A shows the pixels of the image information MS of the size 135 F or the largest size while FIG. 10B shows one of the image information MS of a disc size or the smallest size. The pixels of the largest film or the size 135 F are used as the reference and the zoom lens 41 is driven to magnify pixels of the film of the size smaller than the size 135 F. More specifically, the pixels of the disc size shown in FIG. 10B are magnified on the image sensor 42 to the extent that the information thereof can be detected in size substantially identical to the pixel area of the size 135 F.

After adjusting the size of the area which receives the light on the two-dimensional image sensor 42 by the zoom lens 41, the negative film 2 is advanced to the printing section by the conveying mechanism 9 (Step S7) and printing is conducted as mentioned above (Step S8). As the size of the light receiving area on the image sensor 42 is constantly adjusted to be a given size irrespective of the size of the negative film 2, complicated steps in cllasifying pixels can be omitted substantially and yet exposure amount can be calculated by a predetermined expression.

Figure 11:
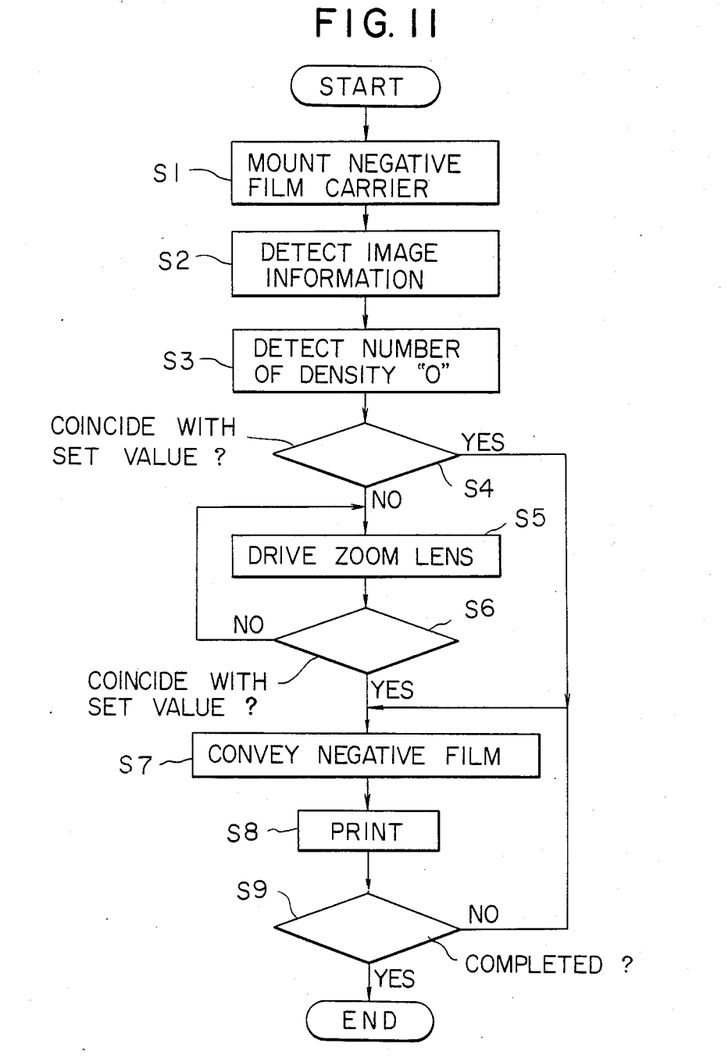
FIG. 11 is a flow chart to show another embodiment of this invention.

FIG. 11 is a flow chart to show another embodiment of this invention method wherein steps are the same as shown in FIG. 9 up to the step of detection of the density "0". The setter 45 has been set with the number of density "0" areas which defines the number of pixels in light receiving areas on the image sensor 42 irrespective of the size of the negative film 2. The setting signals SV from the setter 45 has been inputted to the arithmetic processing circuit 44. The detected number of the density "0" (the minimum value) in correspondence to the area or the length of the aperture 1A of the negative film carrier 1 is compared with the setting signal SV by the arithmetic processing circuit 44 (Step S4). The number of the maximum density outside the aperture 1A of the negative film carrier 1 can be detected to achieve the same effect. When the detected value does not coincide with the set value VS, the arithmetic processing circuit 44 gives a driving signal DV to the driving mechanism 46 to actuate the zoom lens 31 (Step S5). The arithmetic processing circuit 44 repeatedly compares above values with the set value VS while the zoom lens 41 is being driven and discriminates whether or not such coincidence has been made (Step S6), and keeps on driving the lens 41 until the time they coincide. FIG. 10A shows pixels of the image information MS of the largest size or the size 135 F while FIG. 10B shows one of the image information MS of a disc size or the smallest size. The number of pixels of the size 135 F is set as the reference, and the number of pixels of the film of a size smaller than 135 F is controlled to increase with the driving signal DV. The zoom lens 41 is actuated for the above operation. The object of detection by the arithmetic processing circuit 44 is not limited to the number of the density "0" but may be the sum of densities, and comparison may be made between the sum and the set signal SV corresponding thereto.

In the examples shown in FIGS. 10A and 10B, the pixels on the image sensor 42 are depicted considerably larger than the actual segment size to facilitate understanding, but pixels of the image sensor 42 are actually small enough to be adjusted to a predetermined size by the zoom lens 41 from the size of the negative film 2. Although the zoom lens 41 is inclined from the two-dimensional image sensor 42 in FIG. 8, it may be provided in parallel thereto. The size of the negative film 2 may also be detected indirectly from the magnification index which is equal to the displacement from the reference position of the zoom lens 41.

As described in the foregoing, since this invention method can detect image information of the area including an original film frame and extending to the periphery thereof with an image sensor to detect image information of the original film out of the densities of a large number of segments of a frame, and simultaneously detects image information on the area of substantially the same number of pixel segments, arithmetic processing of the exposure in printing section can be automatically and simply conducted irrespective of the size of the negative film frames.

It should be understood that many modifications and adaptations of the invention will become apparent to those skilled in the art and it is intended to encompass such obvious modifications and changes in the scope of the claims appended hereto.

What is claimed is:

1. An image information detecting method comprising the steps of:
    illuminating an original film with light from a light source;
    receiving the light through an aperture of a film carrier and a zoom lens set at a reference magnification with a two-dimensional image sensor;
    detecting image information of the whole area of said two-dimensional image sensor which receives the light for each pixel segment;
    discriminating the size of the original film by comparing said detected characteristic values with a reference value; and
    adjusting the light receiving areas of said two-dimensional image sensor in accordance with the result of said discrimination by driving said zoom lens thereby to detect image information in the area of substantially the same number of pixels irrespective of the size of said original film frame.

2. The image information detecting method as claimed in claim 1, wherein said characteristic values are digital values.

3. The image information detecting method as claimed in claim 2, wherein said characteristic values are density values.

4. The image information detecting method as claimed in claim 2, wherein said characteristic values are anti-logarithmic values.

5. The image information detecting method as claimed in claim 1, wherein said zoom lens is continuously driven.

6. The image information detecting method as claimed in claim 1, wherein said zoom lens is driven stepwise.

7. The image information detecting method as claimed in claim 1, wherein the optical axis of said image sensor and zoom lens is inclined from the optical axis of said original picture.

8. The image information detecting method as claimed in claim 7, wherein said image sensor is arranged in parallel to said original picture.

9. An image information detecting method comprising the steps of:
    illuminating an original picture with light from a light source;
    receiving the light transmitting or reflected from the original picture via zoom lens;
    detecting image information in the whole area of said two-dimensional image sensor which receives light including the periphery of the original picture for every pixel segment;
    driving said zoom lens in a manner to make the detected characteristic value coincided with a reference value; and
    adjusting the light receiving area of said two-dimensional image sensor thereby to detect image information in substantially the same number of pixels irrespective of the size of original pictures.

* * * * *